US012778011B2

(12) United States Patent
Cleodolphi et al.

(10) Patent No.: US 12,778,011 B2
(45) Date of Patent: Nov. 3, 2026

(54) SYSTEM AND METHOD FOR MONITORING CROP YIELD FOR AN AGRICULTURAL HARVESTER

(71) Applicant: CNH Industrial America LLC, New Holland, PA (US)

(72) Inventors: Daenio Cleodolphi, Piracicaba (BR); João Augusto Marcolin Lucca, São Pedro (BR)

(73) Assignee: CNH Industrial America LLC, New Holland, PA (US)

( * ) Notice: Subject to any disclaimer, the term of this patent is extended or adjusted under 35 U.S.C. 154(b) by 707 days.

(21) Appl. No.: 17/976,368

(22) Filed: Oct. 28, 2022

(65) Prior Publication Data

US 2023/0135915 A1 May 4, 2023

(30) Foreign Application Priority Data

Oct. 31, 2021 (BR) ...................... 10 2021 021947 5

(51) Int. Cl.
*A01D 43/08* (2006.01)
*A01D 45/10* (2006.01)
*G01F 1/86* (2006.01)

(52) U.S. Cl.
CPC ........... *A01D 43/085* (2013.01); *A01D 45/10* (2013.01); *G01F 1/86* (2013.01)

(58) Field of Classification Search
CPC .......... A01D 43/085; A01D 45/10; G01F 1/86
See application file for complete search history.

(56) References Cited

U.S. PATENT DOCUMENTS 6,508,049 B1 * 1/2003 Cox ........................ A01D 45/10 56/10.2 R
9,961,833 B2 5/2018 Halmann
2008/0264024 A1 * 10/2008 Baaken ................ A01D 43/086 56/10.2 B (Continued)

FOREIGN PATENT DOCUMENTS

CN 102379188 A 3/2012
CN 109743973 A 5/2019

(Continued)

OTHER PUBLICATIONS

Office Action from CN 202211331330.X, mailed on Feb. 3, 2026, 18 pages.

*Primary Examiner* — Claude J Brown
(74) *Attorney, Agent, or Firm* — Dority & Manning, P.A.

(57) ABSTRACT

In one aspect, a system for monitoring crop yield for an agricultural harvester includes a material processing system configured to receive a flow of harvested materials, a first sensor configured to generate data indicative of a volume of the flow of harvested materials being directed through the material processing system, and a second sensor configured to generate data indicative of a density of the flow of harvested materials being directed through the material processing system. In addition, the system includes a computing system communicatively coupled to the first and second sensors, with the computing system being configured to determine a mass flow rate of the flow of harvested materials through the material processing system based at least in part on the data received from the first and second sensors.

17 Claims, 5 Drawing Sheets

(56) References Cited

U.S. PATENT DOCUMENTS

| | | | | |
|---|---|---|---|---|
| 2010/0110428 | A1* | 5/2010 | Priesnitz | G01J 3/02 56/10.1 |
| 2010/0269470 | A1* | 10/2010 | Price | A01D 45/10 56/10.2 H |
| 2010/0332051 | A1* | 12/2010 | Kormann | A01F 12/46 701/2 |
| 2011/0030469 | A1 | 2/2011 | Kormann | |
| 2015/0124054 | A1* | 5/2015 | Darr | G01F 25/0084 348/46 |
| 2015/0342118 | A1* | 12/2015 | Corbett | A01D 41/1274 73/114.25 |
| 2016/0084813 | A1* | 3/2016 | Anderson | G01N 33/025 702/5 |
| 2016/0084987 | A1* | 3/2016 | Dybro | G01V 99/00 702/5 |
| 2017/0071127 | A1* | 3/2017 | Cracraft | A01D 41/127 |
| 2017/0089742 | A1* | 3/2017 | Bruns | A01D 41/1273 |
| 2017/0112060 | A1* | 4/2017 | Noonan | A01D 69/02 |
| 2019/0037770 | A1* | 2/2019 | Dugas | A01D 45/10 |
| 2019/0124848 | A1* | 5/2019 | Johnson | B60P 1/42 |
| 2019/0146426 | A1 | 5/2019 | Blank | |
| 2020/0090094 | A1 | 3/2020 | Blank | |
| 2020/0344949 | A1* | 11/2020 | Kalverkamp | A01F 12/446 |
| 2021/0015045 | A1 | 1/2021 | Vandike et al. | |
| 2021/0127582 | A1 | 5/2021 | Burnley et al. | |
| 2022/0232763 | A1* | 7/2022 | Palla | G05D 1/0278 |
| 2022/0304232 | A1* | 9/2022 | Kormann | A01D 43/085 |

FOREIGN PATENT DOCUMENTS

| | | | |
|---|---|---|---|
| CN | 211090704 | U | 7/2020 |
| DE | 102009053316 | A1 | 5/2011 |
| WO | WO 2019/044304 | A1 | 3/2019 |

* cited by examiner

SYSTEM AND METHOD FOR MONITORING CROP YIELD FOR AN AGRICULTURAL HARVESTER

CROSS-REFERENCE TO RELATED APPLICATIONS

The present application is based upon and claims the right of priority to Brazilian Patent Application No. BR 10 2021 021947 5, filed Oct. 31, 2021, the disclosure of which is hereby incorporated by reference herein in its entirety for all purposes.

FIELD OF THE INVENTION

The present disclosure relates generally to agricultural harvesters, such as sugarcane harvesters, and, more particularly, to systems and methods for monitoring crop yield of an agricultural harvester.

BACKGROUND OF THE INVENTION

Typically, agricultural harvesters include an assembly of processing equipment for processing harvested crop materials. For instance, within a sugarcane harvester, severed sugarcane stalks are conveyed via a feed roller assembly to a chopper assembly that cuts or chops the sugarcane stalks into pieces or billets (e.g., 6 inch cane sections). The processed crop material discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device.

During operation of the harvester, it is typically desirable to monitor the crop yield as the machine goes through the field. For sugarcane harvesters, existing yield monitoring systems rely upon a sensorized plate positioned within the elevator assembly to estimate the crop yield based on the load sensed thereby as the sugarcane passes over the plate. While such systems are equipped to provide accurate yield data, the various components of the system are quite expensive, thereby rendering the system cost-prohibitive for some users. Moreover, the sensorized plates typically require a significant amount of maintenance, including the time require to remove any dirt, mud, or other materials that have accumulated between the plate and the elevator.

Accordingly, systems and methods for monitoring the crop yield for an agricultural harvester that address one or more issues associated with existing systems/methods would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring crop yield for an agricultural harvester. The system includes a material processing system configured to receive a flow of harvested materials, a first sensor configured to generate data indicative of a volume of the flow of harvested materials being directed through the material processing system, and a second sensor configured to generate data indicative of a density of the flow of harvested materials being directed through the material processing system. In addition, the system includes a computing system communicatively coupled to the first and second sensors, with the computing system being configured to determine a mass flow rate of the flow of harvested materials through the material processing system based at least in part on the data received from the first and second sensors.

In another aspect, the present subject matter is directed to an agricultural harvester that includes a frame and a material processing system supported relative to the frame, with the material processing system being configured to process a flow of harvested materials. The material processing system includes a feed roller assembly extending between a first end and a second end and including a plurality of bottom rollers and a plurality of top rollers. The feed roller assembly is configured to receive the flow of harvested materials and direct the flow of harvested materials along a flow path defined between the plurality of bottom rollers and the plurality of top rollers from the first end of the feed roller assembly to the second end of the feed roller assembly. The material processing system also includes a chopper assembly positioned downstream of the feed roller assembly such that the chopper assembly receives the flow of the harvested materials from the feed roller assembly. In addition, the harvester includes a first sensor configured to detect a parameter associated with a distance defined between a first roller of the plurality of top rollers and a second roller of the plurality of bottom rollers, and a second sensor configured to detect a pressure associated with an operation of the chopper assembly. Moreover, the harvester includes a computing system communicatively coupled to the first and second sensors, with the computing system being configured to determine a mass flow rate of the flow of harvested materials through the material processing system based at least in part on the data received from the first and second sensors.

In a further aspect, the present subject matter is directed to a method for monitoring crop yield for an agricultural harvester, with the agricultural harvester including a material processing system configured to receive a flow of harvested materials. The method includes receiving, with a computing system, data indicative of a volume of the flow of harvested materials being directed through the material processing system, and receiving, with the computing system, data indicative of a density of the flow of harvested materials being directed through the material processing system. In addition, the method includes determining, with the computing system, a mass flow rate of the flow of harvested materials directed through the material processing system based on the data received from the first and second sensors, and initiating, with the computing system, a control action in response to determining the mass flow rate of the flow of harvested materials directed through the material processing system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
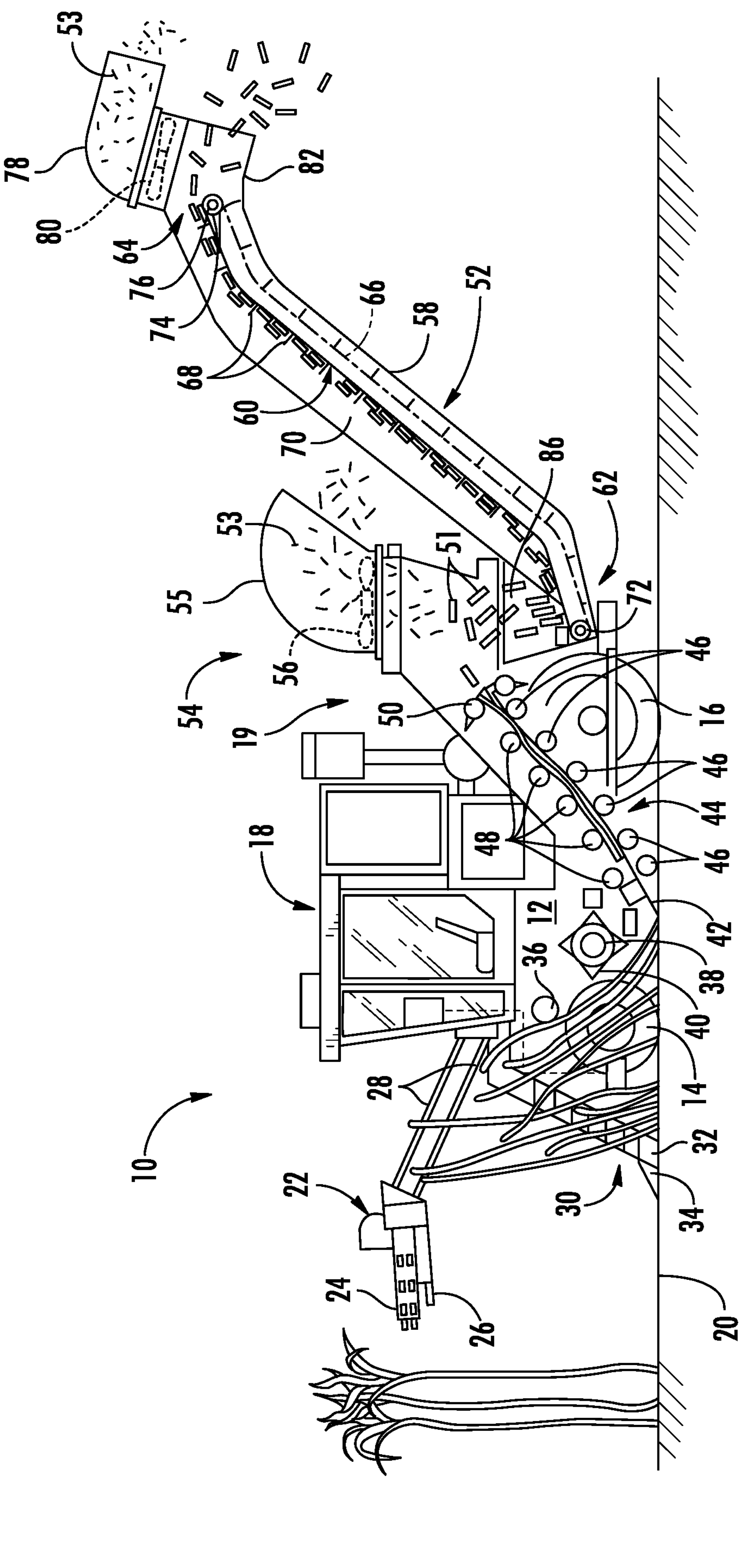
FIG. 1 illustrates a simplified, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the crop yield of an agricultural harvester. In several embodiments, a computing system is communicatively coupled to one or more volume-related sensors that generate data associated with the volume of harvested materials being directed through a material processing system of a harvester and one or more density-related sensors that generate data associated with the density of such harvested materials. Such volume-related and density-related data may, in turn, be used by the computing system to monitor the crop yield of the harvester, such as by allowing the computing system to calculate or determine the mass flow rate of the harvested materials directed through the material processing system of the harvester. In addition to monitoring the crop yield based on the volume-related and density-related sensor data, the computing system may also be configured to initiate or execute one or more control actions associated with the monitored crop yield.

The presently disclosed system and method generally provide numerous advantages for monitoring the crop yield of the harvester. For instance, the volume-related and density-related sensors described herein can be implemented using relatively low cost sensors, thereby minimizing the overall costs to the end-user. Moreover, the sensors require little or no maintenance, thereby eliminating (or least minimizing) the downtime associated with maintaining the sensors of existing yield monitoring systems.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

The harvester 10 may also include a material processing system 19 incorporating various components, assemblies, and/or sub-assemblies of the harvester 10 for cutting, processing, cleaning, and discharging sugarcane as the cane is harvested from an agricultural field 20. For instance, the material processing system 19 may include a topper assembly 22 positioned at the front end of the harvester 10 to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator.

The material processing system 19 may further include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. Moreover, as shown in FIG. 1, the material processing system 19 may include a knock-down roller 36 positioned near the front wheels 14 and a fin roller 38 positioned behind the knock-down roller 36. As the knock-down roller 36 is rotated, the sugarcane stalks being harvested are knocked down while the crop divider 30 gathers the stalks from agricultural field 20. Further, as shown in FIG. 1, the fin roller 38 may include a plurality of intermittently mounted fins 40 that assist in forcing the sugarcane stalks downwardly. As the fin roller 38 is rotated during the harvest, the sugarcane stalks that have been knocked down by the knock-down roller 36 are separated and further knocked down by the fin roller 38 as the harvester 10 continues to be moved in the forward direction relative to the field 20.

Referring still to FIG. 1, the material processing system 19 of the harvester 10 may also include a base cutter assembly 42 positioned behind the fin roller 38. As is generally understood, the base cutter assembly 42 may include blades (not shown) for severing the sugarcane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugarcane as the cane is knocked down by the fin roller 38.

Moreover, the material processing system 19 may include a feed roller assembly 44 located downstream of the base cutter assembly 42 for moving the severed stalks of sugarcane from base cutter assembly 42 along the processing path of the material processing system 19. As shown in FIG. 1, the feed roller assembly 44 may include a plurality of bottom rollers 46 and a plurality of opposed, top pinch rollers 48. The various bottom and top rollers 46, 48 may be used to pinch the harvested sugarcane during transport. As the sugarcane is transported through the feed roller assembly 44, debris (e.g., rocks, dirt, and/or the like) may be allowed to fall through bottom rollers 46 onto the field 20.

In addition, the material processing system 19 may include a chopper assembly 50 located at the downstream end of the feed roller assembly 44 (e.g., adjacent to the rearward-most bottom and top rollers 46, 48). In general, the chopper assembly 50 may be used to cut or chop the severed sugarcane stalks into pieces or “billets” 51, which may be, for example, six (6) inches long. The billets 51 may then be propelled towards an elevator assembly 52 of the material processing system 19 for delivery to an external receiver or storage device (not shown).

As is generally understood, pieces of debris 53 (e.g., dust, dirt, leaves, etc.) separated from the sugarcane billets 51 may be expelled from the harvester 10 through a primary extractor 54 of the material processing system 19, which is located immediately behind the chopper assembly 50 and is oriented to direct the debris 53 outwardly from the harvester 10. Additionally, an extractor fan 56 may be mounted within the primary extractor 54 for generating a suction force or vacuum sufficient to pick up the debris 53 and force the debris 53 through the primary extractor 54. The separated or cleaned billets 51, heavier than the debris 53 being expelled through the extractor 54, may then fall downward to the elevator assembly 52.

As shown in FIG. 1, the elevator assembly 52 may include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span of the elevator 60 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, in some embodiments, pieces of debris 53 (e.g., dust, dirt, leaves, etc.) separated from the elevated sugarcane billets 51 may be expelled from the harvester 10 through a secondary extractor 78 of the material processing system 19 coupled to the rear end of the elevator housing 58. For example, the debris 53 expelled by the secondary extractor 78 may be debris remaining after the billets 51 are cleaned and debris 53 expelled by the primary extractor 54. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

During operation, the harvester 10 is traversed across the agricultural field 20 for harvesting sugarcane. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10. As the stalks enter the crop divider 30, the ground shoes 34 may set the operating width to determine the quantity of sugarcane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugarcane stalks are conveyed rearwardly by the bottom and top rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugarcane stalks into pieces or billets 51 (e.g., 6 inch cane sections). The processed crop material discharged from the chopper assembly 50 is then directed as a stream of billets 51 and debris 53 into the primary extractor 54. The airborne debris 53 (e.g., dust, dirt, leaves, etc.) separated from the sugarcane billets is then extracted through the primary extractor 54 using suction created by the extractor fan 56. The separated/cleaned billets 51 then fall downwardly through an elevator hopper 86 into the elevator assembly 52 and travel upwardly via the elevator 60 from its proximal end 62 to its distal end 64. During normal operation, once the billets 51 reach the distal end 64 of the elevator 60, the billets 51 fall through the elevator discharge opening 82 to an external storage device. If provided, the secondary extractor 78 (with the aid of the extractor fan 80) blows out trash/debris 53 from harvester 10, similar to the primary extractor 54.

As indicated above, it is generally desirable to monitor the mass flow rate of harvested materials (e.g., sugarcane) through an agricultural harvester to allow the operator to gather data associated with the crop yield and evaluate the performance of the harvester. In addition, the mass flow rate through the harvester may also be used to automate certain functions or control actions associated with the harvester, such as to automatically adjust one or more operational settings of one or more harvester components to improve the efficiency and/or performance thereof. As will be described below, the mass flow rate of the harvested materials may be estimated or determined based on one or more monitored, harvesting-related parameters. For instance, in several embodiments, one or more harvesting-related parameters may be monitored that are indicative of the volume (or volumetric flow rate) of the harvested materials being directed through the material processing system of the harvester while one or more other harvesting-related parameters may be monitored that are indicative of the density of such materials. The mass flow rate of the harvested materials may then be determined as a function of such monitored parameters.

Figure 2:
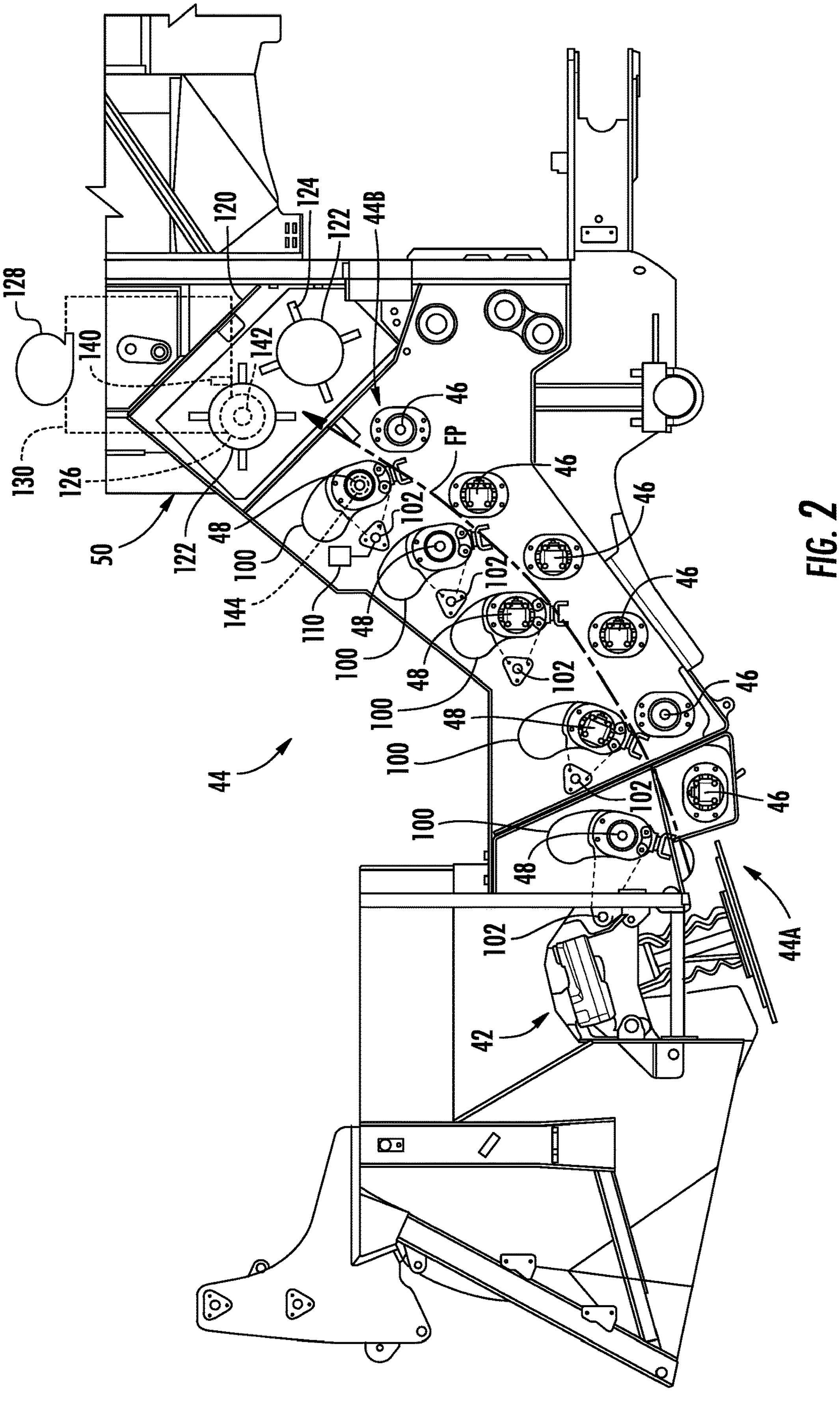
FIG. 2 illustrates a side view of one embodiment of a portion of a material processing system of an agricultural harvester in accordance with aspects of the present subject matter, particularly illustrating one embodiment of a feed roller assembly and a chopper assembly of the material processing system.

Referring now to FIG. 2, a side view of a portion of a material processing system of an agricultural harvester is illustrated in accordance with aspects of the present subject matter, particularly showing a side view of one embodiment of the feed roller assembly 44 and chopper assembly 50 of the material processing system 19 associated with the agricultural harvester 10 described above with reference to FIG. 1.

As shown in FIG. 2, the feed roller assembly 44 extends between a first end 44A and a second end 44B, with the first end 44A of the feed roller assembly 44 being adjacent the base cutter assembly 42 and the second end 44B of the feed roller assembly 44 being adjacent the chopper assembly 50. As such, the first end 44A of the feed roller assembly 44 is configured to receive harvested materials (e.g., severed sugarcane stalks) from the base cutter assembly 42 and to convey the flow of harvested materials along a flow path FP defined between the bottom and top rollers 46, 48 to the chopper assembly 50 at the second end 44B of the feed roller assembly 44. While the feed roller assembly 44 is shown as having six bottom rollers 46 and five top rollers 48, it should be appreciated that the feed roller assembly 44 may have any other suitable number of bottom and/or top rollers 46, 48.

Figure 3A:
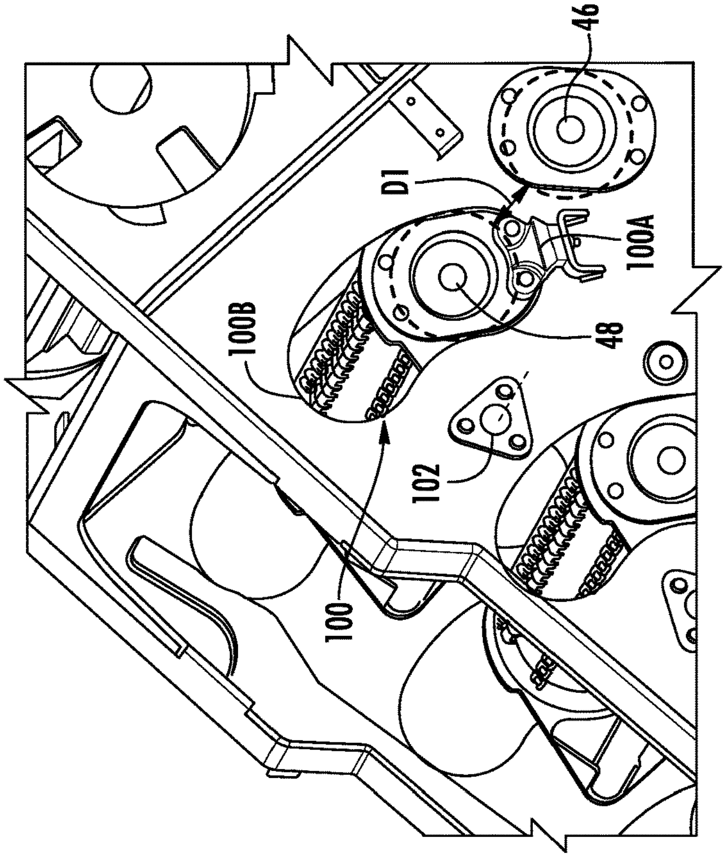
FIGS. 3A and 3B illustrate a detail view of one embodiment of a top roller of a feed roller assembly of an agricultural harvester in accordance with aspects of the present subject matter, particularly illustrating the top roller in a lowered position and in a raised position, respectively.
Figure 3B:
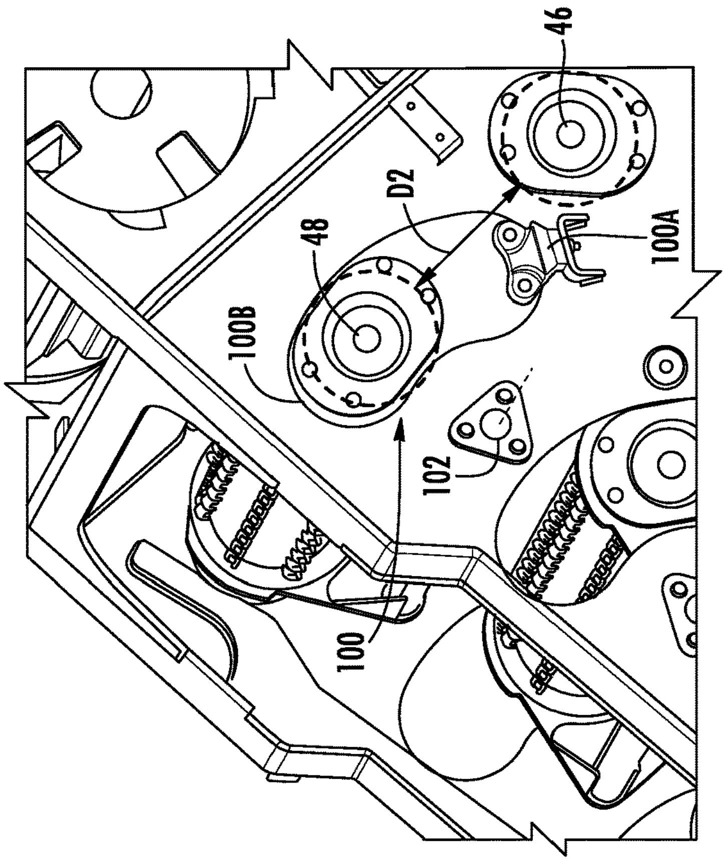

Due to variations in the volume of harvested materials being processed by the material processing system 19, the flow of harvested materials through the feed roller assembly 44 will inherently vary in thickness. As such, one set of the rollers of the feed roller assembly 44 may be configured as floating rollers (with the other set of rollers being configured as fixed or non-floating rollers) such that the spacing between the bottom and top rollers 46, 48 is variable to account for changes in the volume of the harvested materials being directed through the feed roller assembly 44. For instance, in one embodiment, each of the top rollers 48 is movable within a respective slot 100. As particularly shown in FIGS. 3A and 3B, each slot 100 may extend between a first slot end 100A and a second slot end 100B. When the top roller 48 abuts against the first slot end 100A, the top roller 48 is in a lowest position, such that the top roller 48 is spaced by a first distance D1 from the respective bottom roller 46. When the top roller 48 abuts against the second slot end 100B, the top roller 48 is in a highest position, such that the top roller 48 is spaced by a second distance D2 from the respective bottom roller 46. In one embodiment, the first distance D1 is the closest that the top roller 48 may be from the adjacent bottom roller 46 and the second distance D2 is the furthest that the top roller 48 may be from the adjacent bottom roller 46. In some embodiments, the top rollers 48 are pivotable about a respective pivot joint 102 to move within the slot 100 between the first and second slot ends 100A, 100B. For instance, the top roller 48 may be pivoted about the pivot joint 102 between a first angular position, corresponding to the first distance D1, and a second angular position, corresponding to the second distance D2. However, in other embodiments, the top rollers 48 may be configured to move within the slot in any other suitable way. Alternatively, the top rollers 48 may be fixed or non-floating and the bottom rollers 46 may, instead, be movable to allow the spacing between the bottom and top rollers 46, 48 to be varied.

In accordance with aspects of the present subject matter, one or more sensors may be provided in association with the feed roller assembly 44 for detecting variations in the spacing between the bottom and top rollers 46, 48, thereby providing an indication of the volume of harvested materials being directed through the feed roller assembly 44. Specifically, in the illustrated embodiment, one or more displacement sensors 110 may be provided for detecting the displacement of one or more respective top rollers 48 of the feed roller assembly 44, including, for example, the magnitude and/or rate of the displacement. For instance, as shown in FIG. 2, a displacement sensor 110 is provided in operative association with the furthest downstream top roller 48 of the feed roller assembly 44 to detect the displacement of the roller 48 relative to the adjacent bottom roller 46 as harvested materials are directed through the feed roller assembly 44, thereby providing an indication of the material volume being processed through the material processing system 19. In an alternative embodiment in which the bottom rollers 46 are movable and the top rollers 48 are fixed or non-floating, the displacement sensor(s) 110 may, instead, be configured to detect the displacement of one or more of the bottom rollers 46 as harvested materials are directed through the feed roller assembly 44.

It should be appreciated that, although a single displacement sensor 110 is shown as being associated with the feed roller assembly 44, any number of displacement sensors 110 may be used to monitor the displacement of any number of the floating rollers so as to provide an indication of the volume of harvested materials being directed through the feed roller assembly 44. It should further be appreciated that the displacement sensor(s) 110 may comprise any suitable sensor(s) or combination of sensors for detecting displacement of an associated floating roller of the feed roller assembly 44, such as angular position sensors, accelerometers, and/or the like. Additionally, it should be appreciated that, in alternative embodiments, any other suitable type of sensor(s) may be used to generate data indicative of the volume of harvested materials being directed through the material processing system 19 of the harvester 10, such as cameras and/or other imaging devices, radar or sonar sensors, and/or the like.

Additionally, as shown in FIG. 2, the chopper assembly 50 may generally include an outer housing 120 and one or more chopper drums 122 rotatably supported within the chopper housing 120. As is generally understood, the chopper drums 122 are configured to be rotatably driven within the housing 120 such that chopper elements 124 extending outwardly from each drum 122 (e.g., blades) cut or chop the harvested materials received from the feed roller assembly 44, thereby generating a stream of processed harvested materials (e.g., including both billets 51 and debris 53) that is discharged from the chopper assembly 50 via an outlet of the housing 120. Additionally, as shown in FIG. 2, a hydraulic motor(s) 126 is provided in association with the chopper drums 122 for rotationally driving the drums 122. The hydraulic motor(s) 126 is, in turn, fluidly coupled to a hydraulic pump 128 of the vehicle's hydraulic system (e.g., via an associated hydraulic circuit 130—shown in dashed lines) such that pressurized hydraulic fluid can be delivered from the pump 128 to rotationally drive the motor(s) 126.

During operation of the chopper assembly 50, an anti-rotation or resistive force is applied to the chopper drums 122 that generally varies depending on both the volume of harvested materials being directed between the chopper drums 122 and the density of such harvested materials. As indicated above, the volume of harvested materials can be monitored or determined by detecting the floating roller displacement within the feed roller assembly 44. Thus, by knowing the volume of harvested materials, the material density of the harvested materials can be estimated or inferred by detecting one or more parameters indicative of the resistive force applied to the chopper drums 122 by the harvested materials being directed therebetween. In several embodiments, this resistive force (and, thus, the density of the harvested materials) is directly related to the pressure of the hydraulic fluid that must be supplied to the hydraulic motor(s) 126 in order to maintain the drums 122 rotating at a given rotational speed (e.g., a desired RPM setting). Thus, in accordance with aspects of the present subject matter, one or more pressure sensors 140 may be provided to monitor the fluid pressure associated with the hydraulic motor(s) 126, thereby providing an indication of the density of the harvested materials being directed through the chopper assembly 50. For instance, as shown in FIG. 2, a pressure sensor 140 is provided in fluid communication with the hydraulic circuit 130 coupling the motor 126 to the pump 128 to monitor the fluid pressure of the hydraulic fluid being suppled thereto.

It should be appreciated that, although a single pressure sensor 140 is shown as being used to monitor the fluid pressure associated with the operation of the chopper assembly 50, any number of pressure sensors 110 may be used to monitor the fluid pressure. Additionally, it should be appreciated, that in alternative embodiments, any other suitable type of sensor(s) may be used to generate data indicative of the density of the materials being directed through the material processing system, such as any other suitable sensor(s) configured to detect a parameter associated with the resistive force applied to the chopper drums 122 of the chopper assembly 50.

It should also be appreciated that various other sensors or sensing devices may be provided in operative association with the feed roller assembly 44 and/or the chopper assembly 50. In one embodiment, one or more speed sensors may be provided to monitor the rotational speed of the feeder rollers 46, 48 and/or the chopper drums 122. For instance, as shown in FIG. 2, a first speed sensor 142 may be provided in association with the chopper assembly 150 to monitor the rotational speed of the chopper drums 122, such as by installing the sensor 142 in association with the motor 126 driving the drums 122. Additionally, as shown in FIG. 2, a second speed sensor 144 may be provided in association with the feed roller assembly 44 to monitor the rotational speed of the rollers and, thus, the feed rate through the assembly 44.

As will be described below, a computing system may be provided in association with an agricultural harvester that is configured to determine or estimate the mass flow rate of the harvested materials through the harvester's material processing system based on sensor feedback associated with one or more harvesting-related parameter. For instance, in several embodiments, the computing system may be communicatively coupled to the above-described sensors 110, 140 to obtain data associated with the volume and density of the harvested materials being directed through the material processing system 19, thereby allowing the mass flow rate of the harvested materials to be subsequently calculated or determined. For instance, the volume-related data received from the displacement sensor(s) 110 may be used to determine a volumetric flow rate of the harvested materials through the feeder assembly 44, while the density-related data received from the pressure sensor(s) 110 may be used to determine the material density of the harvested materials. Such variables may be then used to calculate the mass flow rate through the material processing system 19 (e.g., an instantaneous mass flow rate through the system) using the following relationship (Equation 1):

$$M=q\times\varphi \tag{1}$$

wherein: M corresponds to the mass flow rate of the harvested materials in kilograms per second (kg/s); Q corresponds to the volumetric flow rate of the harvested materials in meters cubed per second ($m^3/s$); and φ corresponds to the density of the harvested materials in kilograms per meters cubed ($kg/m^3$).

As indicated above, the volume-related roller displacement data provided via the displacement sensors 110 may be used to determine the volumetric flow rate of the harvested materials through the material processing system 19. Specifically, the displacement data may allow for the distance or height defined between the bottom and top rollers 46, 48 to be determined, which may then be used to calculate the volumetric flow rate. For instance, in one implementation, the volumetric flow rate may be calculated using the following equation (Equation 2):

$$Q=\frac{W*H*V}{60} \tag{2}$$

wherein: Q corresponds to the volumetric flow rate of the harvested materials in meters cubed per second ($m^3/s$); W corresponds to the width of the feeder assembly 44 in meters (m) (e.g., at the location within the feed roller assembly 44 at which the floating roller displacement is being monitored); H corresponds to the distance or height defined between the bottom and top rollers 46, 48 in meters (m) (e.g., at the location within the feed roller assembly 44 at which the floating roller displacement is being monitored); and V corresponds to the speed at which the harvested materials are being fed through the feeder assembly 44 in meters per minute (m/min) (e.g., as determined as a function of the rotational speed of the rollers 46, 48 of the feeder assembly 44 or as a function of the rotational speed of the chopper drums 122 when a known relationship exists between the chopper drum rotation and the roller rotation, one or both of which can be monitored via the speed sensors 142, 144 described above).

It should be appreciated that, although Equation 2 above incorporates a denominator value of 60 for converting minutes-to-seconds (e.g., to allow the determined mass flow rate to be expressed in kilograms per second (kg/s)), any other suitable time basis or units may be used for the equations contained herein.

The distance or height (H) defined between the bottom and top rollers 46, 48 may also be expressed as function of the percentage that the monitored roller has been currently displaced between its minimum height (e.g., when the top roller 48 is at position 100A in slot 100 and distance D1 is defined between the bottom and top rollers 46, 48) and its maximum height (e.g., when the top roller 48 is at position 100B in slot 100 and distance D2 is defined between the bottom and top rollers 46, 48), such as by using the expression (Equation 3):

$$H=D1+(D2-D1)\times DP \tag{3}$$

wherein: H corresponds to the distance or height currently defined between the bottom and top rollers 46, 48 in meters (m); D1 corresponds to the minimum height that cab be defined between the bottom and top rollers 46, 48 in meters (m); D2 corresponds to the maximum height that can be defined between the bottom and top rollers 46, 48 in meters (m); and DP corresponds to the displacement percentage of the monitored roller between its minimum and maximum positions 100A, 100B as monitored via the displacement sensor(s) 110.

Moreover, as indicated above, the density-related data provided via the pressure sensors 140 may be used to determine the density of the harvested materials directed through the material processing system 19. Specifically, in several embodiments, the instantaneous chopper-related pressure that is detected while chopping harvested materials can be compared to a baseline chopper-related pressure associated with the chopper drums 122 being rotated without any resistive force applied thereto (e.g., when the chopper drums 122 are being rotated without any materials being directed therebetween) to determine a pressure differential between such pressures. This pressure differential may then be used in combination with a correction factor that takes into account the volume of harvested materials being directed through the chopper assembly 50 to determine the material density. For instance, in one implementation, the density of the harvested materials may be calculated using the following equation (Equation 4):

$$\varphi = X \times (P_{work} - P_{empty}) \tag{4}$$

wherein: φ corresponds to the density of the harvested materials in kilograms per meters cubed (kg/m$^3$); X corresponds to a correction or adjustment factor in kilograms per meters cubed bar (kg/m$^3$ bar) determined as a function of the volume of harvested materials being directed through the chopper assembly 50 (e.g., by using an associated look-up table that correlates the volume determine via the displacement sensor(s) 110 to the adjustment factor); $P_{work}$ corresponds to the instantaneous or monitored fluid pressure associated with the chopper assembly 50 in bars as harvested materials are being processed by the assembly 50 (e.g., as determined based on the data received from the pressure sensor(s)); and $P_{empty}$ corresponds to the baseline fluid pressure associated with the chopper assembly 50 operating without any harvested materials being processed by the assembly 50.

It should be appreciated that the above-referenced equations may be combined to allow for the mass flow rate of the harvested materials to be expressed as a function of both the displacement percentage (e.g., as determined as a function of the data received from the displacement sensor(s) 110) and the fluid pressure (e.g., as determined as a function of the data received from the pressure sensor(s) 140). For instance, the mass flow rate may be expressed according to the following relationship (Equation 5):

$$M = \frac{W * (D1 + (D2 - D1) * DP) * V}{60} * X * (P_{work} - P_{empty}) \tag{5}$$

wherein: M corresponds to the mass flow rate of the harvested materials in kilograms per second (kg/s); W corresponds to the width of the feeder assembly 44 in meters (m); D1 corresponds to the minimum height that cab be defined between the bottom and top rollers 46, 48 in meters (m); D2 corresponds to the maximum height that can be defined between the bottom and top rollers 46, 48 in meters (m); DP corresponds to the displacement percentage of the monitored roller between its minimum and maximum positions 100A, 100B; V corresponds to the speed at which the harvested materials are being fed through the feeder assembly 44 in meters per minute (m/min); X corresponds to a correction or adjustment factor in kilograms per meters cubed bar (kg/m$^3$ bar) determined as a function of the volume of harvested materials being directed through the chopper assembly 50; $P_{work}$ corresponds to the instantaneous or monitored fluid pressure associated with the chopper assembly 50 in bars as harvested materials are being processed by the assembly 50; and $P_{empty}$ corresponds to the baseline fluid pressure associated with the chopper assembly 50 operating without any harvested materials being processed by the assembly 50.

Figure 4:
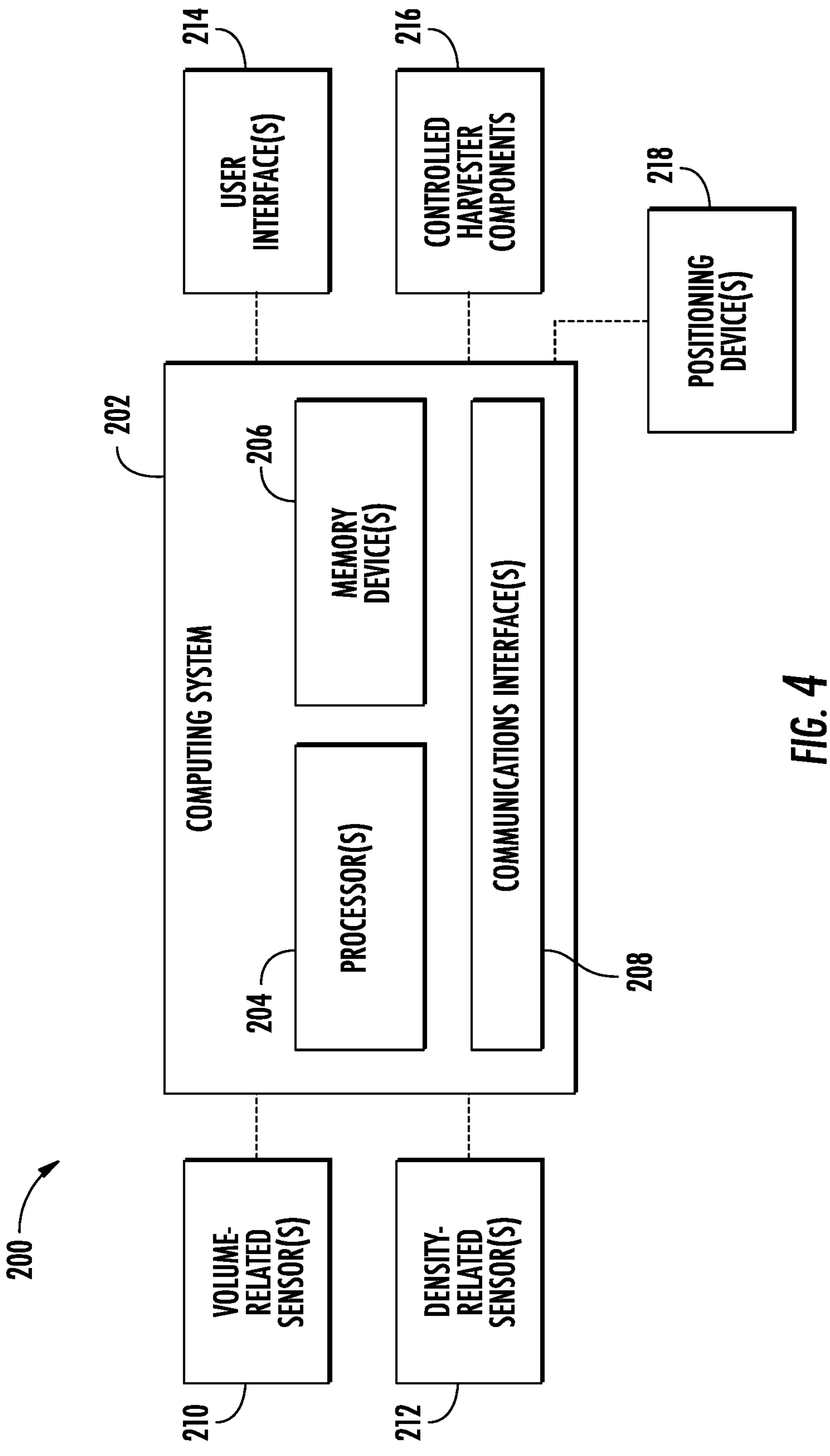
FIG. 4 illustrates a schematic view of one embodiment of a system for monitoring crop yield for an agricultural harvester in accordance with aspects of the present subject matter.

Referring now to FIG. 4, a schematic view of one embodiment of a system 200 for monitoring the crop yield of an agricultural harvester is illustrated in accordance with aspects of the present subject matter. In general, the system 200 will be described herein with reference to the agricultural harvester 10 and associated components described above with reference to FIGS. 1-3B. However, it should be appreciated that the disclosed system 200 may be implemented with harvesters having any other suitable configurations.

As shown in FIG. 4, the system 200 may include a computing system 202 and various other components configured to be communicatively coupled to and/or controlled by the computing system 202. For instance, the computing system 202 may be communicatively coupled to one or more volume-related sensors 210 that generate data associated with the volume of harvested materials being directed through the material processing system 19 of the harvester 10 and one or more density-related sensors that generate data associated with the density of such harvested materials. As indicated above, the volume-related sensor(s) 210 may, in one embodiment, correspond to one or more displacement sensors 110 configured to detect variations in the distance or height defined between a given pair of adjacent top and bottom rollers 46, 48 of the feed roller assembly 44 by monitoring the displacement of one of such rollers 46, 48 (e.g., the floating roller) relative to the other. Similarly, as indicated above, the density-related sensor(s) 212 may, in one embodiment, correspond to one or more pressure sensors 140 configured to detect a fluid pressure associated with the operation of the chopper assembly 50, such as the fluid pressure of the hydraulic fluid that must be supplied to the hydraulic motor(s) 126 to maintain the chopper drums 122 rotating at a given speed despite the anti-rotation or resistive force applied by the harvested materials against the chopper drums 122. Such volume-related and density-related data may, in turn, be used by the computing system 202 to calculate or determine the mass flow rate of the harvested materials directed through the material processing system 19 of the harvester 10, thereby allowing the computing system to monitor the crop yield and initiate or execute one or more control actions associated with the monitored crop yield.

In addition, the computing system may be communicatively coupled to and/or configured to control a user interface 214. The user interface 214 described herein may include, without limitation, any combination of input and/or output devices that allow an operator to provide inputs to the computing system 202 and/or that allow the computing system 202 to provide feedback to the operator, such as a keyboard, display, keypad, pointing device, buttons, knobs, touch sensitive screen, mobile device, audio input device, audio output device, and/or the like. Moreover, as will be described below, the computing system 202 may also be communicatively coupled to and/or configured to control one or more additional components of the harvester 10 to allow the computing system 202 to, for example, automate the operation such harvester components.

In general, the computing system 202 may comprise any suitable processor-based device known in the art, such as a computing device or any suitable combination of computing devices. Thus, in several embodiments, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the methods and algorithms that will be described herein.

It should be appreciated that, in several embodiments, the computing system 202 may correspond to an existing controller of the agricultural harvester 10. However, it should be appreciated that, in other embodiments, the computing system 202 may instead correspond to a separate processing device. For instance, in one embodiment, the computing system 202 may form all or part of a separate plug-in module that may be installed within the agricultural harvester 10 to allow for the disclosed system and method to be implemented without requiring additional software to be uploaded onto existing control devices of the agricultural harvester 10.

In some embodiments, the computing system 202 may be configured to include one or more communications modules or interfaces 208 for the computing system 202 to communicate with any of the various system components described herein. For instance, one or more communicative links or interfaces (e.g., one or more data buses) may be provided between the computing system 202 and the sensor(s) 210, 212 to receive sensor data associated with the volume and density of the harvested materials being directed through the material processing system 19. Further, one or more communicative links or interfaces (e.g., one or more data buses) may be provided between the communications interface 208 and the user interface 214 to allow operator inputs to be received by the computing system 202 and/or the allow the computing system 202 to control the operation of one or more components of the user interface 212. Moreover, one or more communicative links or interfaces (e.g., one or more data buses) may be provided between the communications interface 208 and any other suitable harvester component(s) 216 to allow the computing system 202 to control the operation of such component(s) 216.

As indicated above, the computing system 202 may be configured to monitor the crop yield by estimating or determining the mass flow rate of the harvested materials through the material processing system 19 of the harvester 10. For example, the computing system 202 may include one or more suitable relationships and/or algorithms stored within its memory 206 that, when executed by the processor 204, allow the computing system 202 to estimate or determine the mass flow rate of the harvested materials through the material processing system 19 based at least in part on the sensor data provided by the volume-related and density-related sensors 210, 212. Such relationships and/or algorithms may include or incorporate, for instance, one or more of the mathematical expressions described above with reference to Equations 1-5. For instance, the computing system 202 may be configured to monitor the displacement data received from the displacement sensor(s) 110 to determine the instantaneous displacement percentage of the monitored floating roller (which is indicative of the current distance or height defined between such floating roller and the adjacent fixed roller) and the pressure data received from the pressure sensor(s) 140 to determine the instantaneous fluid pressure associated with the current operation of the chopper assembly 50. Such continuously monitored parameters may then be used to calculate the instantaneous mass flow rate of the harvested materials being directed through the material processing system 19 of the harvester 10, such as by inputting such monitored parameters into the afore-mentioned Equation 5 and/or by using one or more related look-up tables to "look-up" the mass flow rate associated with such monitored parameters.

Moreover, the computing system 202 may also be configured to initiate one or more control actions associated with or related to the mass flow rate determined as a function of the monitored parameters. For instance, in several embodiments, the computing system 202 may automatically control the operation of the user interface 214 to provide an operator notification associated with the determined mass flow rate. Specifically, in one embodiment, the computing system 202 may control the operation of the user interface 214 in a manner that causes data associated with the determined mass flow rate to be presented to the operator of the harvester 10, such as by presenting raw or processed data associated with the mass flow rate including numerical values, graphs, maps, and/or any other suitable visual indicators.

Additionally, in some embodiments, the control action initiated by the computing system 202 may be associated with the generation of a yield map based at least in part on the mass flow rate determined as a function of the monitored parameters. For instance, in one embodiment, the computing system 202 may be communicatively coupled to a positioning device(s) 218 installed on or within the harvester 10 that is configured to determine the exact location of the harvester 10, such as by using a satellite navigation position system (e.g. a GPS system, a Galileo positioning system, the Global Navigation satellite system (GLONASS), the BeiDou Satellite Navigation and Positioning system, and/or the like). In such an embodiment, the location data provided by the positioning device(s) 218 may be correlated to the mass flow rate calculations to generate a yield map associated with the crop yield at each location within the field. For instance, the location coordinates derived from the positioning device(s) 218 and the mass flow rate data may both be time-stamped. In such an embodiment, the time-stamped data may allow each mass flow rate datapoint to be matched or correlated to a corresponding set of location coordinates received from the positioning device(s) 218, thereby allowing the precise location of the portion of the field associated with the mass flow rate datapoint to be determined by the computing system 202. The resulting yield map may, for example, simply correspond to a data table that maps or correlates each mass flow rate datapoint to an associated field location.

Alternatively, the yield map may be presented as a geospatial mapping of the mass flow rate data, such as a heat map that indicates the variability in the mass flow rate across the field.

Moreover, in some embodiments, the computing system 202 may additionally or alternatively be configured to automatically control the operation of one or more components of the harvester 216 based at least in part on the mass flow rate determined as a function of the monitored parameters. For instance, if the mass flow rate is consistently higher than expected, the operational settings of one or more components of the material processing system 19 may be automatically adjusted to accommodate the increased mass flow through system. Similarly, if the mass flow rate is consistently lower than expected, the operational settings of one or more components of the material processing system 19 may be automatically adjusted to accommodate the reduced mass flow through system. For instance, the computing system 202 may be configured to automatically adjust the ground speed of the harvester 10 (e.g., by automatically controlling the operation of the engine, transmission, and/or braking system of the harvester 10), the fan speed associated with one or both extractors 54, 78 (e.g., by automatically controlling the operation of the associated fan 56, 80), the elevator speed e.g., by automatically controlling the operation of the elevator motor 76), and/or any other suitable operational settings to accommodate variations in the mass flow through the system.

Figure 5:
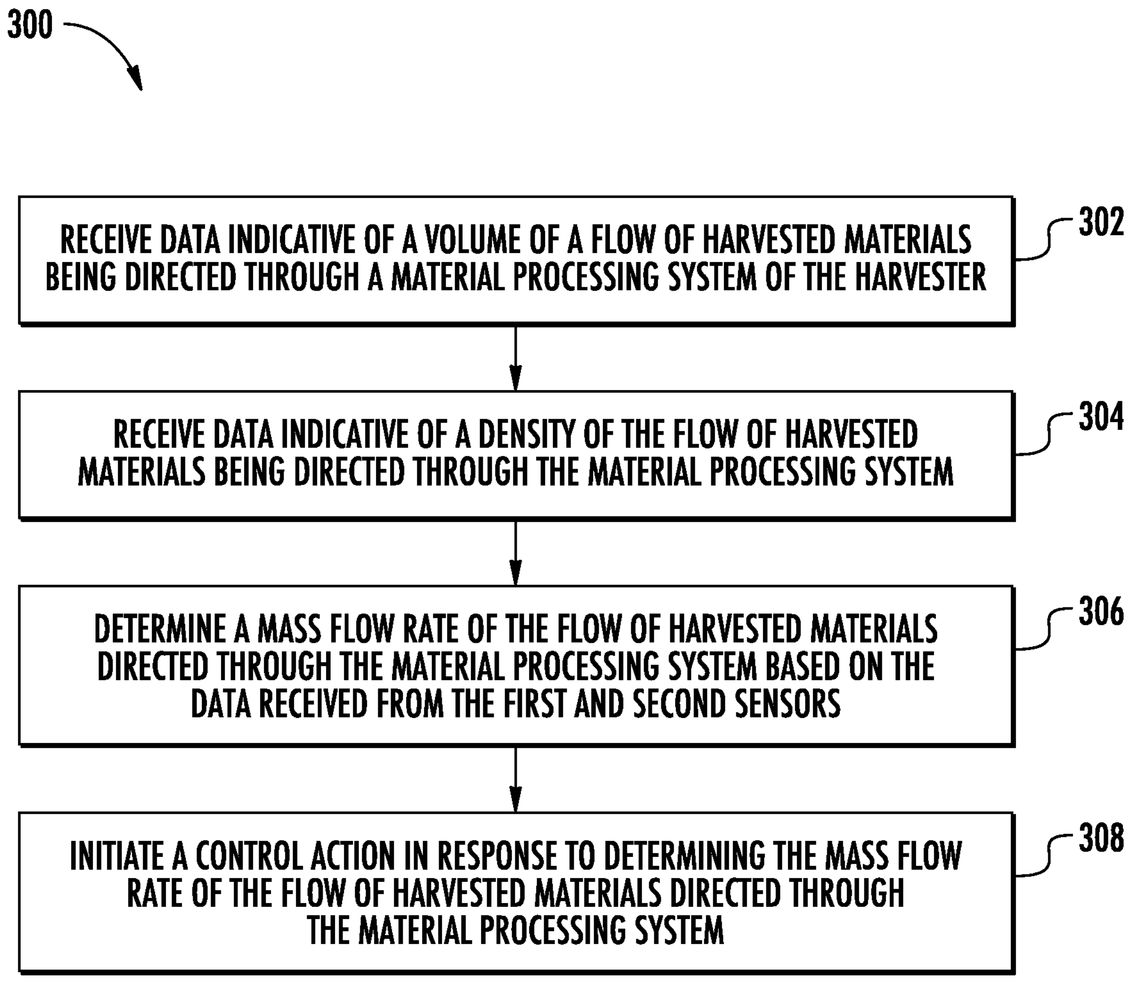
FIG. 5 illustrates a flow diagram of one embodiment of a method for monitoring crop yield for an agricultural harvester in accordance with aspects of the present subject matter.

Referring now to FIG. 5, a flow diagram of one embodiment of a method 300 for monitoring the crop yield for an agricultural harvester is illustrated in accordance with aspects of the present subject matter. In general, the method 300 will be described herein with reference to the agricultural harvester 10 and related components described with reference to FIGS. 1-3B, and the various components of the system 200 described with reference to FIG. 4. However, it should be appreciated that the disclosed method 300 may be implemented with harvesters having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (302), the method 300 may include receiving data indicative of a volume of a flow of harvested materials being directed through a material processing system of the harvester. For instance, as described above, the computing system 202 may be communicatively coupled to one or more volume-related sensors 210 configured to generate data associated with the volume of the harvested materials being directed through the material processing system 19. As an example, the volume-related sensor(s) 210 may, in one embodiment, correspond to one or more displacement sensors 110 configured to detect variations in the distance or height defined between a given pair of adjacent top and bottom rollers 46, 48 of the feed roller assembly 44 by monitoring the displacement of one of such rollers 46, 48 (e.g., the floating roller) relative to the other.

Additionally, at (304), the method 300 may include receiving data indicative of a density of the flow of harvested materials being directed through the material processing system. For instance, as described above, the computing system 202 may be communicatively coupled to one or more density-related sensors 212 configured to generate data associated with the density of the harvested materials being directed through the material processing system 19. As an example, the density-related sensor(s) 212 may, in one embodiment, correspond to one or more pressure sensors 140 configured to detect a fluid pressure associated with the operation of the chopper assembly 50, such as the fluid pressure of the hydraulic fluid that must be supplied to the hydraulic motor(s) 126 to maintain the chopper drums 122 rotating at a given speed despite the anti-rotation or resistive force applied by the harvested materials against the chopper drums 122.

Additionally, at (306), the method 300 may include determining a mass flow rate of the flow of harvested materials directed through the material processing system based on the data received from the first and second sensor. Specifically, as indicated above, the computing system 202 may be configured to determine the mass flow rate of the harvested materials being directed through the material processing system 19 based on the volume-related and density-related data received from the sensors 210, 212. For example, the computing system 202 may include one or more suitable relationships and/or algorithms stored within its memory 206 that, when executed by the processor 204, allow the computing system 202 to estimate or determine the mass flow rate of the harvested materials through the material processing system 19 based at least in part on the sensor data provided by the volume-related and density-related sensors 210, 212.

Referring still to FIG. 5, at (308), the method 300 may include initiating a control action in response to determining the mass flow rate of the flow of harvested materials directed through the material processing system. For example, as indicated above, the computing system 202 may be configured to initiate any number of control actions in association with the determined mass flow rate, including, but not limited to, presenting data associated with the mass flow rate to the operator via the associated user interface 214, generating a yield map based at least in part on the determined mass flow rate and/or automatically controlling the operation of a component of the harvester 10 based at least in part on the determined mass flow rate.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term “software code” or “code” used herein refers to any instructions or set of instructions that influence the operation of a computer or computing system. They may exist in a computer-executable form, such as machine code, which is the set of instructions and data directly executed by a computer’s central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system of monitoring crop yield of an agricultural harvester, the system comprising:

a material processing system that receives a flow of harvested materials, the material processing system including a chopper assembly that receives and processes the flow of harvested materials;

a first sensor that generates data indicative of a volume of the flow of harvested materials being directed through the material processing system;

a second sensor that detects a pressure associated with an operation of the chopper assembly, the pressure being indicative of a density of the flow of harvested materials directed through the material processing system and wherein the pressure comprises a fluid pressure associated with rotationally driving one or more chopper drums of the chopper assembly; and a computing system communicatively coupled to the first and second sensors, the computing system determines a mass flow rate of the flow of harvested materials through the material processing system based at least in part on the data received from the first and second sensors.

2. The system of claim 1, wherein:

the material processing system comprises a feed roller assembly including a plurality of top rollers and a plurality of bottom rollers, with the flow of harvested materials being directed along a flow path defined between the plurality of top rollers and the plurality of bottom rollers; and the first sensor detects a parameter associated with a distance defined between a first roller of the plurality of top rollers and a second roller of the plurality of bottom rollers, the distance being indicative of the volume of the flow of harvested materials directed through the material processing system.

3. The system of claim 2, wherein the first sensor detects displacement of one of the first roller or the second roller relative to the other of the first roller or the second roller as the flow of harvested materials is being directed through the feed roller assembly.

4. The system of claim 1, wherein the computing system further initiates a control action based at least in part on the determined mass flow rate of the flow of harvested materials through the material processing system.

5. The system of claim 4, wherein the control action comprises at least one of:

presenting data associated with the determined mass flow rate to an operator via a user interface of the agricultural harvester;

generating a yield map based at least in part on the determined mass flow rate; or automatically controlling an operation of a component of the agricultural harvester based at least in part on the determined mass flow rate.

6. An agricultural harvester, comprising:

a frame;

a material processing system supported relative to the frame and that processes a flow of harvested materials, the material processing system comprising:

a feed roller assembly extending between a first end and a second end and including a plurality of bottom rollers and a plurality of top rollers, the feed roller assembly receives the flow of harvested materials and directs the flow of harvested materials along a flow path defined between the plurality of bottom rollers and the plurality of top rollers from the first end of the feed roller assembly to the second end of the feed roller assembly;

a chopper assembly positioned downstream of the feed roller assembly such that the chopper assembly receives the flow of the harvested materials from the feed roller assembly;

a first sensor that detects a parameter associated with a distance defined between a first roller of the plurality of top rollers and a second roller of the plurality of bottom rollers;

a second sensor that detects a fluid pressure associated with rotationally driving one or more chopper drums of the chopper assembly; and a computing system communicatively coupled to the first and second sensors, the computing system determines a mass flow rate of the flow of harvested materials through the material processing system based at least in part on the data received from the first and second sensors.

7. The agricultural harvester of claim 6, wherein:

the computing system determines a volume of the flow of harvested materials directed through the material processing system based at least in part on the data received from the first sensor; and the computing system determines a density of the flow of the harvested materials directed through the material processing system based at least in part on the data received from the second sensor.

8. The agricultural harvester of claim 7, wherein the computing system determines the mass flow rate based at least in part on the determined volume and density of the flow of harvested materials through the material processing system.

9. The agricultural harvester of claim 6, wherein the first sensor detects displacement of one of the first roller or the second roller relative to the other of the first roller or the second roller.

10. The agricultural harvester of claim 6, wherein the computing system further initiates a control action based on the determined mass flow rate of the flow of harvested materials through the material processing system.

11. The agricultural harvester of claim 6, wherein the control action comprises at least one of:

presenting data associated with the determined mass flow rate to an operator via a user interface of the agricultural harvester;

generating a yield map based at least in part on the determined mass flow rate; or automatically controlling an operation of a component of the agricultural harvester based at least in part on the determined mass flow rate.

12. A method for monitoring crop yield of an agricultural harvester, the method comprising:

receiving, with a computing system, data indicative of a volume of a flow of harvested materials being directed through a material processing system of the agricultural harvester, the material processing system including a chopper assembly that receives and processes the flow of harvested materials;

receiving, with the computing system, data of a pressure associated with an operation of the chopper assembly, the pressure being indicative of a density of the flow of harvested materials being directed through the material processing system and wherein the pressure is a fluid pressure associated with rotationally driving one or more chopper drums of the chopper assembly;

determining, with the computing system, a mass flow rate of the flow of harvested materials directed through the material processing system based on the data received from the first and second sensors; and initiating, with the computing system, a control action in response to determining the mass flow rate of the flow of harvested materials directed through the material processing system.

13. The method of claim 12, wherein the material processing system comprises a feed roller assembly including a plurality of top rollers and a plurality of bottom rollers, with the flow of harvested materials being directed along a flow path defined between the plurality of top rollers and the plurality of bottom rollers; and wherein the receiving the data indicative of the volume of the flow of harvested materials being directed through the material processing system comprises receiving the data from a first sensor that detects a parameter associated with a distance defined between a first roller of the plurality of top rollers and a second roller of the plurality of bottom rollers.

14. The method of claim 12, wherein the receiving the data indicative of the density of the flow of harvested materials being directed through the material processing system comprises receiving the data from a second sensor that detects the fluid pressure associated with rotationally driving the chopper assembly.

15. The method of claim 12, wherein the initiating the control action comprises presenting data associated with the determined mass flow rate to an operator via a user interface of the agricultural harvester.

16. The method of claim 12, wherein the initiating the control action comprises generating a yield map based at least in part on the determined mass flow rate.

17. The method of claim 12, wherein the initiating the control action comprises automatically controlling an operation of a component of the agricultural harvester based at least in part on the determined mass flow rate.

* * * * *